: US 8,005,153 B2
(45) Date of Patent: Aug. 23, 2011

(12) United States Patent
Muharemovic et al.

(54) METHOD AND APPARATUS FOR INCREASING THE NUMBER OF ORTHOGONAL SIGNALS USING BLOCK SPREADING

(75) Inventors: Tarik Muharemovic, Dallas, TX (US); Aris Papasakellariou, Dallas, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1082 days.

(21) Appl. No.: 11/627,035

(22) Filed: Jan. 25, 2007

(65) Prior Publication Data

US 2007/0171995 A1    Jul. 26, 2007

Related U.S. Application Data

(60) Provisional application No. 60/762,071, filed on Jan. 25, 2006.

(51) Int. Cl.
 *H04L 27/00*  (2006.01)
(52) U.S. Cl. ............................. 375/259; 375/295
(58) Field of Classification Search .................. 375/130, 375/259–260, 295, 316; 370/203, 206, 208
 See application file for complete search history.

(56) References Cited

U.S. PATENT DOCUMENTS

| 5,828,660 | A | * | 10/1998 | Baum et al. | 370/330 |
| 5,867,478 | A | * | 2/1999 | Baum et al. | 370/203 |
| 6,363,107 | B1 | * | 3/2002 | Scott | 375/150 |
| 6,744,807 | B1 | | 6/2004 | Linde et al. | |
| 6,922,406 | B2 | * | 7/2005 | Rudolf et al. | 370/350 |
| 6,930,996 | B2 | * | 8/2005 | Rudolf et al. | 370/350 |
| 7,522,656 | B2 | * | 4/2009 | Zhengdi et al. | 375/150 |
| 7,539,263 | B2 | * | 5/2009 | Jung et al. | 375/267 |
| 7,551,598 | B2 | * | 6/2009 | Rudolf et al. | 370/350 |
| 7,616,622 | B2 | * | 11/2009 | Rudolf et al. | 370/350 |
| 7,664,076 | B2 | * | 2/2010 | Kim et al. | 370/335 |
| 2002/0118635 | A1 | | 8/2002 | Nee | |
| 2003/0021365 | A1 | | 1/2003 | Min et al. | |
| 2003/0072395 | A1 | | 4/2003 | Jia et al. | |
| 2004/0252667 | A1 | | 12/2004 | Dent | |
| 2004/0252753 | A1 | | 12/2004 | Li et al. | |
| 2006/0050799 | A1 | * | 3/2006 | Hou et al. | 375/260 |
| 2006/0056528 | A1 | * | 3/2006 | Jung et al. | 375/260 |

FOREIGN PATENT DOCUMENTS

WO    WO 01/13531 A1    2/2001

\* cited by examiner

*Primary Examiner* — Jean B Corrielus
(74) *Attorney, Agent, or Firm* — Ronald O. Neerings; Wade James Brady, III; Frederick J. Telecky, Jr.

(57) ABSTRACT

Embodiments of the invention apply block spreading to transmitted signals to increase the number orthogonally multiplexed signals. The principle of the disclosed invention can be applied to reference signals, acknowledgement signals, and channel quality indication signals. In any given time interval, the set of transmitted signals is defined by two sequences: the baseline sequence, and the block spreading sequence. Different transmitters using the same baseline sequence can be identified by using different block spreading sequences.

24 Claims, 6 Drawing Sheets

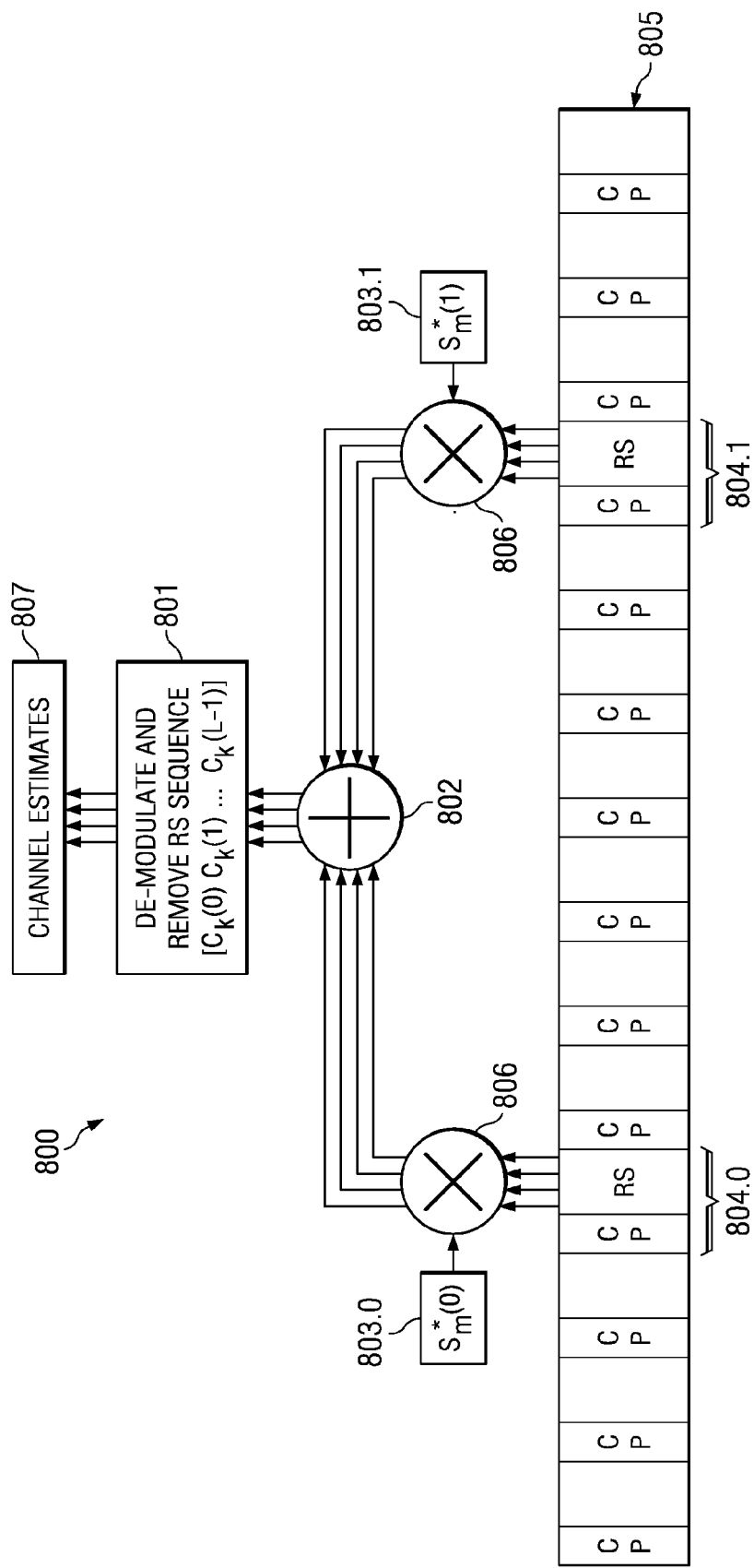

METHOD AND APPARATUS FOR INCREASING THE NUMBER OF ORTHOGONAL SIGNALS USING BLOCK SPREADING

CLAIM OF PRIORITY UNDER 35 U.S.C. §119

The present application for patent claims priority to U.S. Provisional Application No. 60/762,071 entitled "Increasing the Number of Orthogonal Pilot Channels" filed Jan. 25, 2006. All applications assigned to the assignee hereof and hereby expressly incorporated by reference herein.

BACKGROUND

Embodiments of the invention are directed, in general, to wireless communication systems and can be applied to generation and multiplexing of signals in multi-user wireless communications systems based on single-carrier frequency division multiple access (SC-FDMA) and orthogonal frequency division multiple access (OFDMA).

FIG. 1 shows a block diagram of a transmitter 110 and a receiver 150 in a wireless communication system 100. For simplicity, transmitter 110 and receiver 150 are each equipped with a single antenna but in practice they may have two or more antennas. For the downlink (or forward link), transmitter 110 may be part of a base station (also referred to as Node B), and receiver 150 may be part of a terminal (also referred to as user equipment—UE). For the uplink (or reverse link), transmitter 110 may be part of a UE, and receiver 150 may be part of a Node B. A Node B is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

At transmitter 110, a reference signal (also referred to as pilot signal) processor 112 generates reference signal symbols (or pilot symbols). A transmitter (TX) data processor 114 processes (e.g., encodes, interleaves, and symbol maps) traffic data and generates data symbols. As used herein, a data symbol is a modulation symbol for data, a reference signal symbol is a modulation symbol for reference signal, and the term "modulation symbol" refers to a real valued or complex valued quantity which is transmitted across the wireless link. A modulator 120 receives and multiplexes the data and reference symbols, performs modulation on the multiplexed data and reference symbols, and generates transmission symbols. A transmitter unit (TMTR) 132 processes (e.g., converts to analog, amplifies, filters, and frequency up-converts) the transmission symbols and generates a radio frequency (RF) modulated signal, which is transmitted via an antenna 134.

At receiver 150, an antenna 152 receives the RF modulated signal from transmitter 110 and provides a received signal to a receiver unit (RCVR) 154. Receiver unit 154 conditions (e.g., filters, amplifies, frequency down-converts, and digitizes) the received signal and provides input samples. A demodulator 160 performs demodulation on the input samples to obtain received symbols. Demodulator 160 provides received reference signal symbols to a channel processor 170 and provides received data symbols to a data detector 172. Channel processor 170 derives channel estimates for the wireless channel between transmitter 110 and receiver 150 and estimates of noise and estimation errors based on the received reference signal. Data detector 172 performs detection (e.g., equalization or matched filtering) on the received data symbols with the channel estimates and provides data symbol estimates, which are estimates of the data symbols sent by transmitter 110. A receiver (RX) data processor 180 processes (e.g., symbol demaps, deinterleaves, and decodes) the data symbol estimates and provides decoded data. In general, the processing at receiver 150 is complementary to the processing at transmitter 110.

Controllers/processors 140 and 190 direct the operation of various processing units at transmitter 110 and receiver 150, respectively. For example, controller processor 190 may provide demodulator 160 with a replica of the reference signal used by reference signal processor 112 in order for demodulator to perform possible correlation of the two signals. Memories 142 and 192 store program codes and data for transmitter 110 and receiver 150, respectively.

The disclosed invention is applicable, but not restricted to, frequency division multiplexed (FDM) reference signal transmission for simultaneous transmission from multiple UEs. This includes, but is not restricted to, OFDMA, OFDM, FDMA, DFT-spread OFDM, DFT-spread OFDMA, single-carrier OFDMA (SC-OFDMA), and single-carrier OFDM (SC-OFDM) pilot transmission. The enumerated versions of FDM transmission strategies are not mutually exclusive, since, for example, single-carrier FDMA (SC-FDMA) may be realized using the DFT-spread OFDM technique. In addition, embodiments of the invention also apply to general single-carrier systems.

FIG. 2 is an example of a block diagram showing an OFDM (A) transmitter of the reference signal (RS). It comprises of the RS sequence generator 201 and the Modulate block 202, which generate a reference signal block 203. Samples 203 are transmitted over the air. Modulate block further consists of a Tone Map 202A, insertion of zeros or other signals 202B, and the IFFT in 202C. Tone Map 202A can be arbitrary. Elements of apparatus may be implemented as components in a programmable processor or Digital Signal Processor (DSP).

FIG. 3 is an example of a block diagram showing a DFT-spread OFDM(A) (bracketed letter "A" means that the statement holds for both DFT-spread OFDM and DFT-spread OFDMA) reference signal (RS) transmitter. It comprises of the RS sequence generator 301 and the Modulate block 302, which generate a reference signal block 303. Samples 303 are transmitted over the air. Modulate block further consists of: DFT 302D, Tone Map 302A, insertion of zeros or other signals 302B, and the IFFT in 302C. Tone Map 302A can be arbitrary. Elements of apparatus may be implemented as components in a programmable processor or Digital Signal Processor (DSP).

Embodiments of the invention will be described using a family of mathematically well studied sequences, known as CAZAC sequences, as transmitted reference signals for several purposes including coherent demodulation of the data signal and possible channel quality estimation. CAZAC sequences are defined as all complex-valued sequences with the following two properties: 1) constant amplitude (CA), implying that magnitudes of all sequence elements are mutually equal and 2) zero cyclic autocorrelation (ZAC). Well-known examples-of CAZAC sequences include (but are not limited to) Chu and Frank-Zadoff sequences (or Zadoff-Chu sequences), and generalized chirp like (GCL) sequences. Nevertheless, the use of CAZAC reference signals is not mandatory for this invention. There is a need to define reference signal (RS) generation and transmission such that multiple reference signals can be simultaneously orthogonally multiplexed. Such generation should allow efficient use of the RS resources, which will in turn maximize the number of simultaneously multiplexed RS transmitters. Although the exemplary embodiment considers for brevity RS generation and multiplexing, exactly the same principles can be used to orthogonally multiplex other signals and increase their number, including acknowledgement signals (ACK/NAK) and channel quality indication (CQI) signals.

SUMMARY

In light of the foregoing background, embodiments of the invention provide an apparatus, method and system for generating, multiplexing and allocating reference signals to multiple transmitters. The proposed method can produce orthogonally multiplexed signals among the multiple transmitters thereby avoiding corresponding mutual interference.

The exemplary embodiment of the invention considers the generation of reference signals (RS) using constant amplitude zero cyclic auto-correlation (CAZAC) sequences, and block spreading, for multiplexing RS from multiple transmitters. RS can be used for the purposes of coherent data (and/or control) signal demodulation, channel quality estimation, and other functionalities discussed herein. The same exactly principle of block spreading of CAZAC sequences can be extended to the multiplexing of other signals such as acknowledgement signals (ACK/NAK) related to a packet transmission or channel quality indication (CQI) signals. The proposed generation and multiplexing method of RS can be applied to all frequency division multiplex (FDM) systems which are used by multiple UEs, with or without multiple transmit antennas. This includes, but is not restricted to OFDMA, OFDM, FDMA, DFT-spread OFDM, DFT-spread OFDMA, single-carrier OFDMA (SC-OFDMA), and single-carrier OFDM (SC-OFDM) RS transmission.

System and method of embodiments of the present invention solve problems identified in prior techniques and provide additional advantages.

BRIEF DESCRIPTION OF THE DRAWINGS

Figure 1:
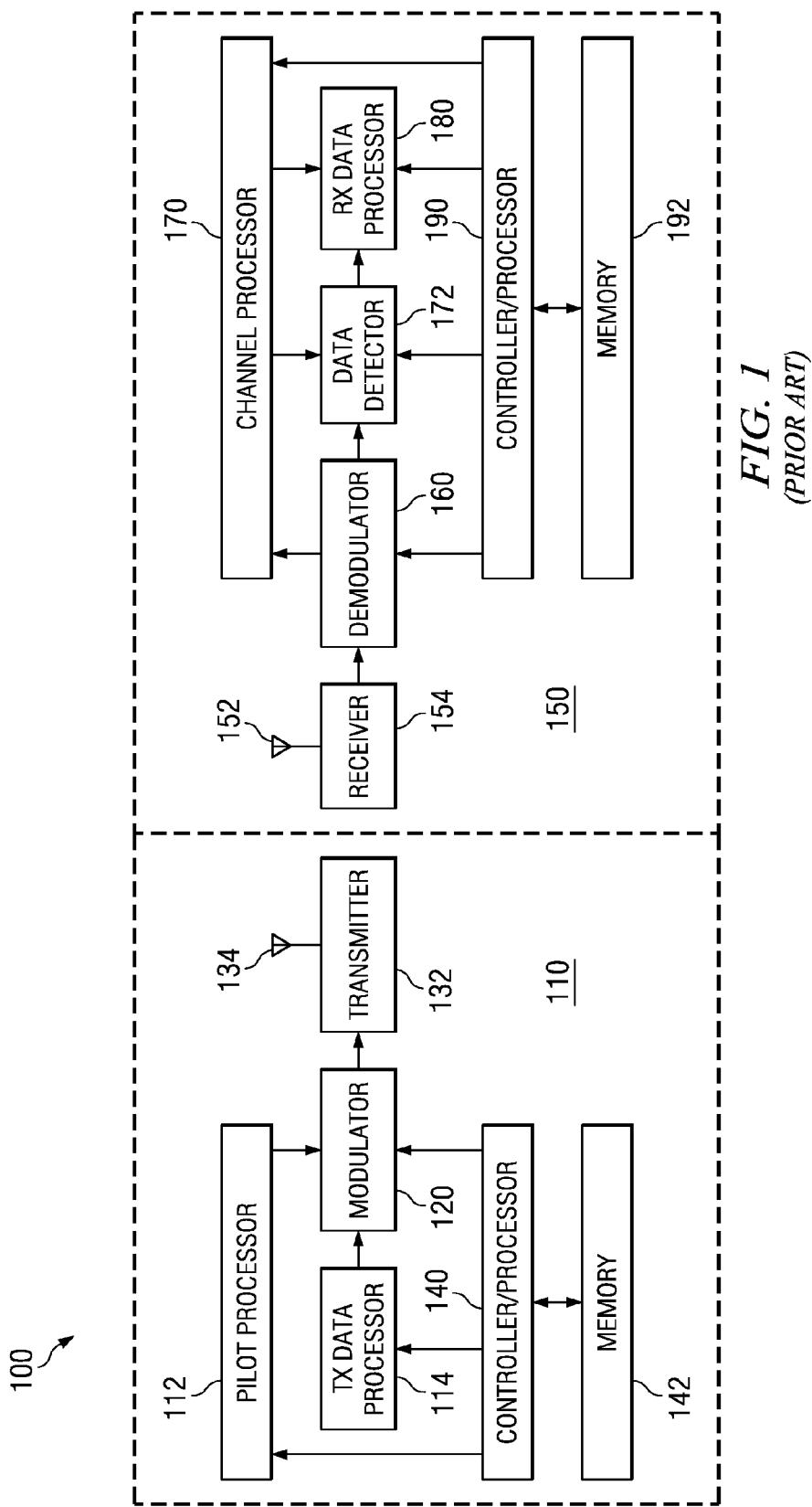
Figure 2:
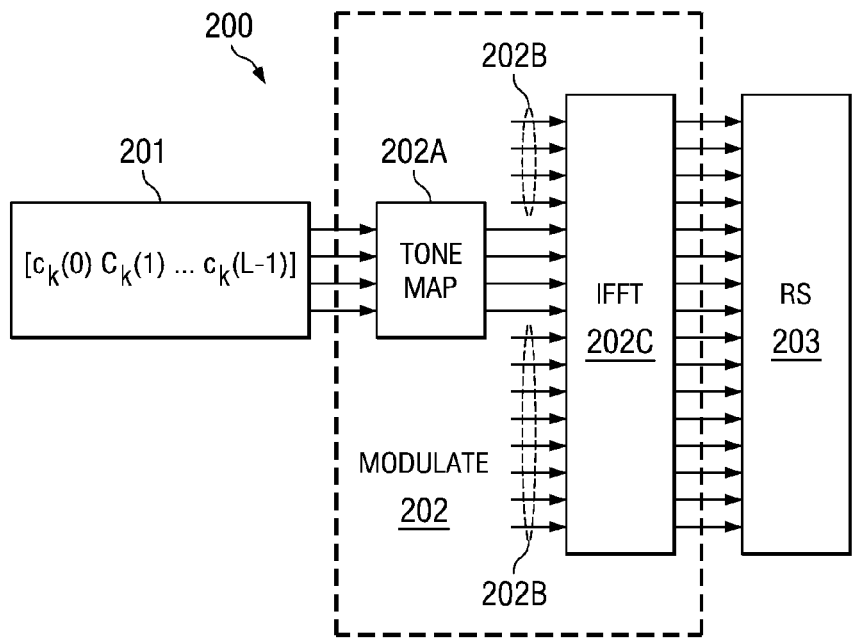
Figure 3:
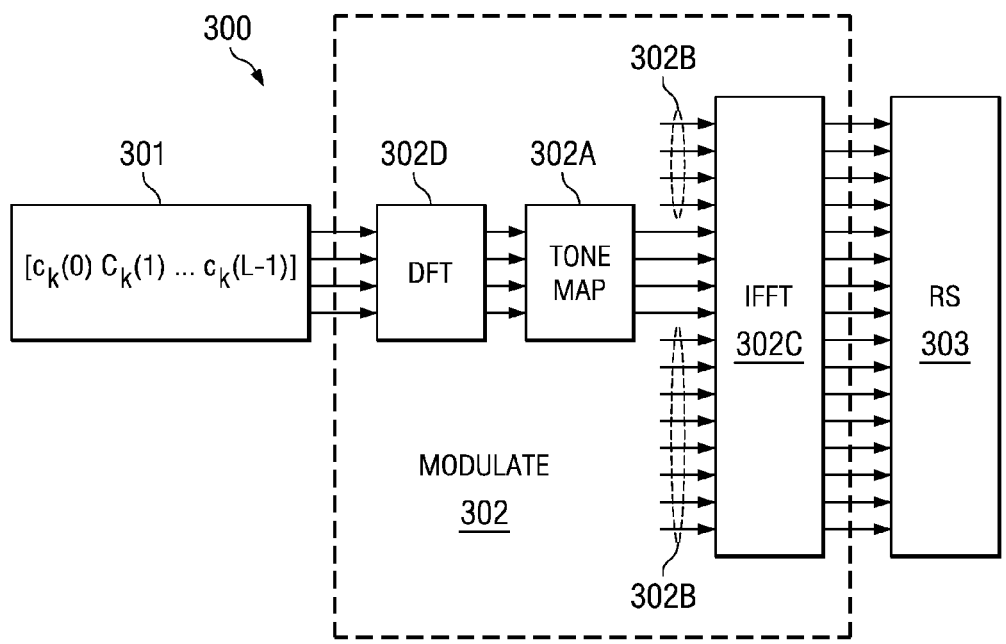
Figure 4:
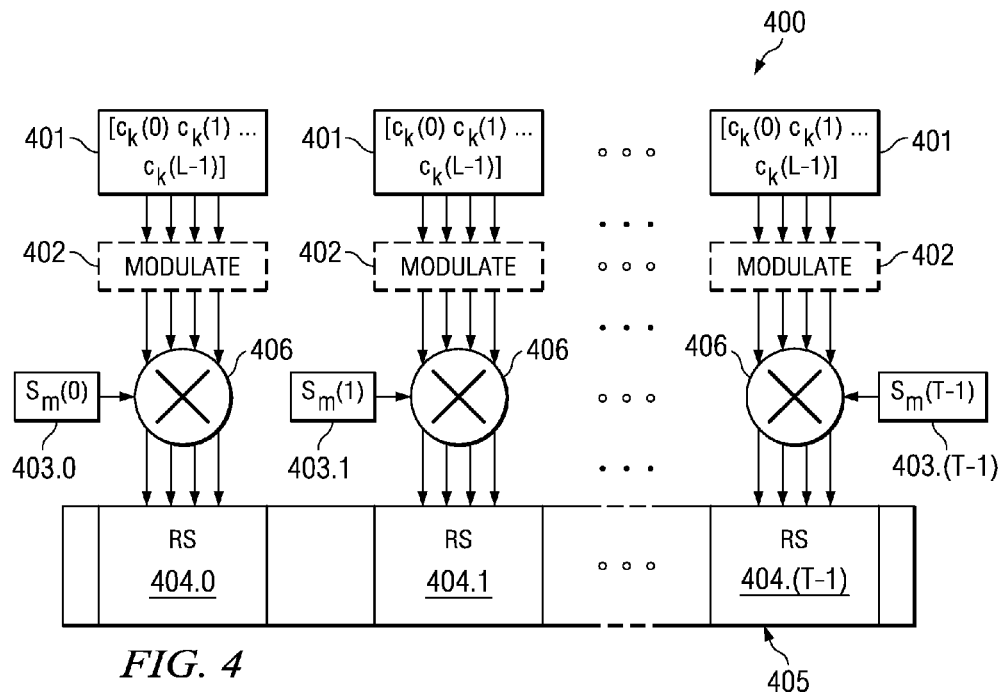
Figure 5:
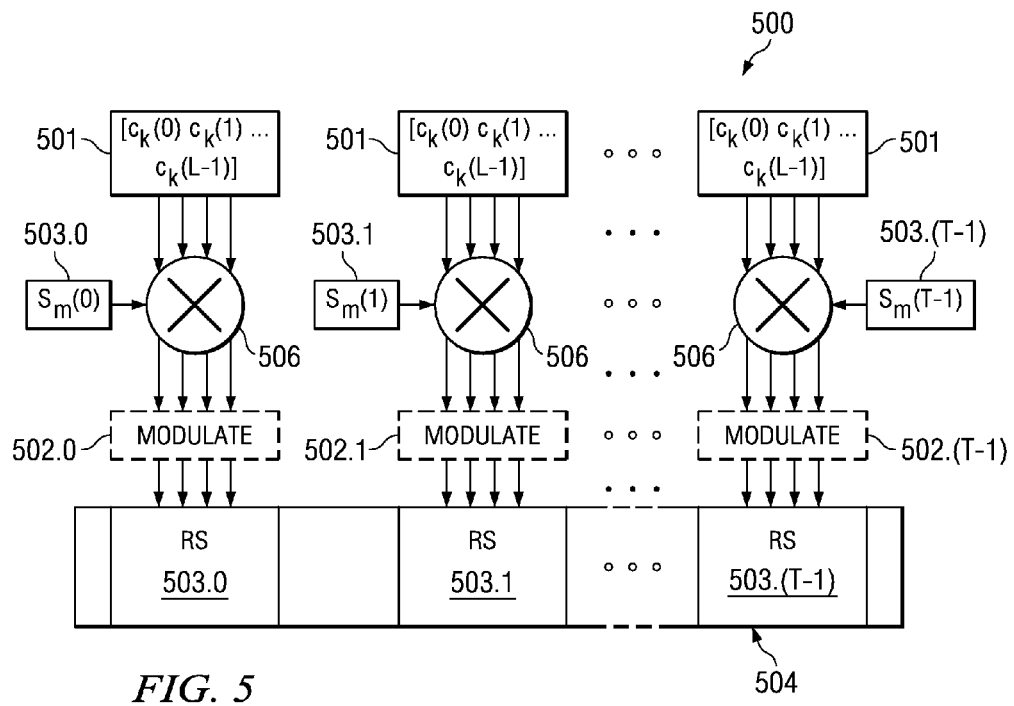
Figure 6:
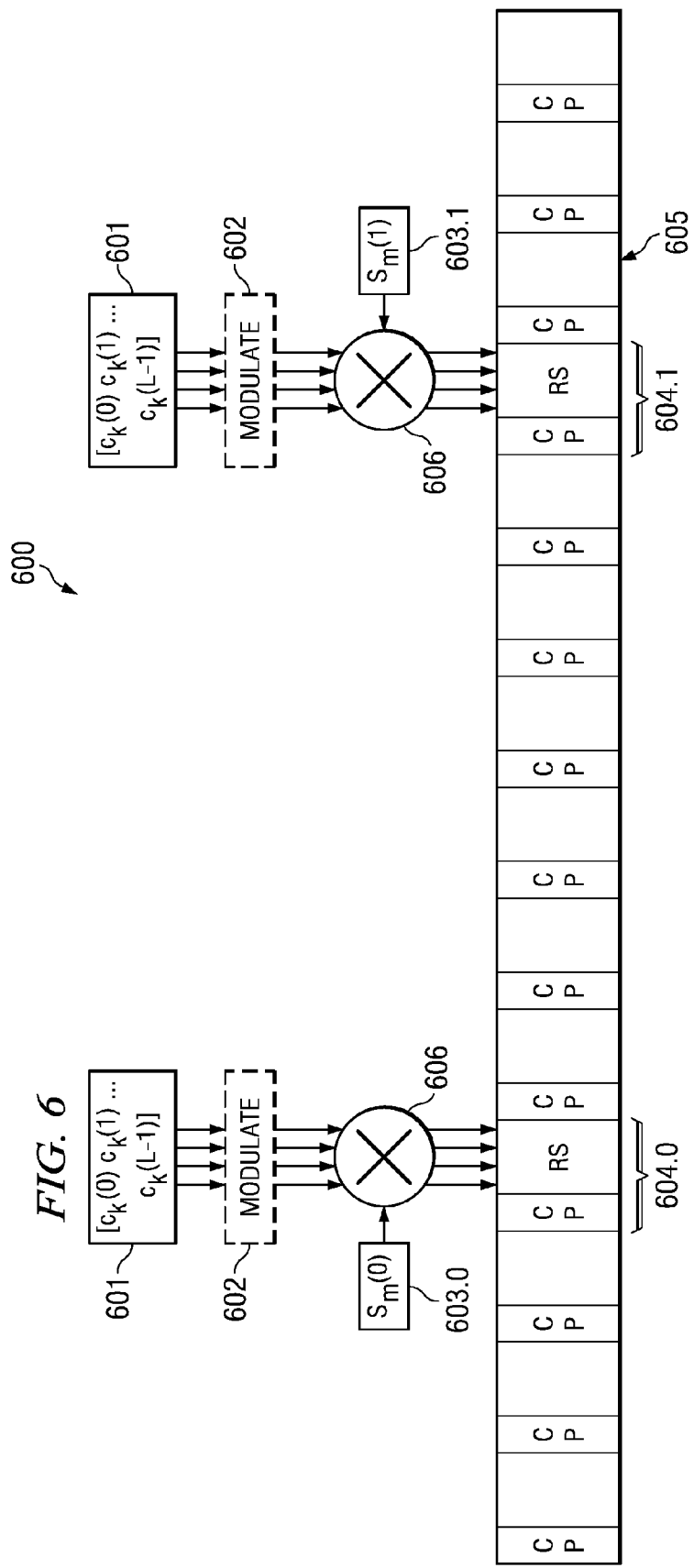
Figure 7:
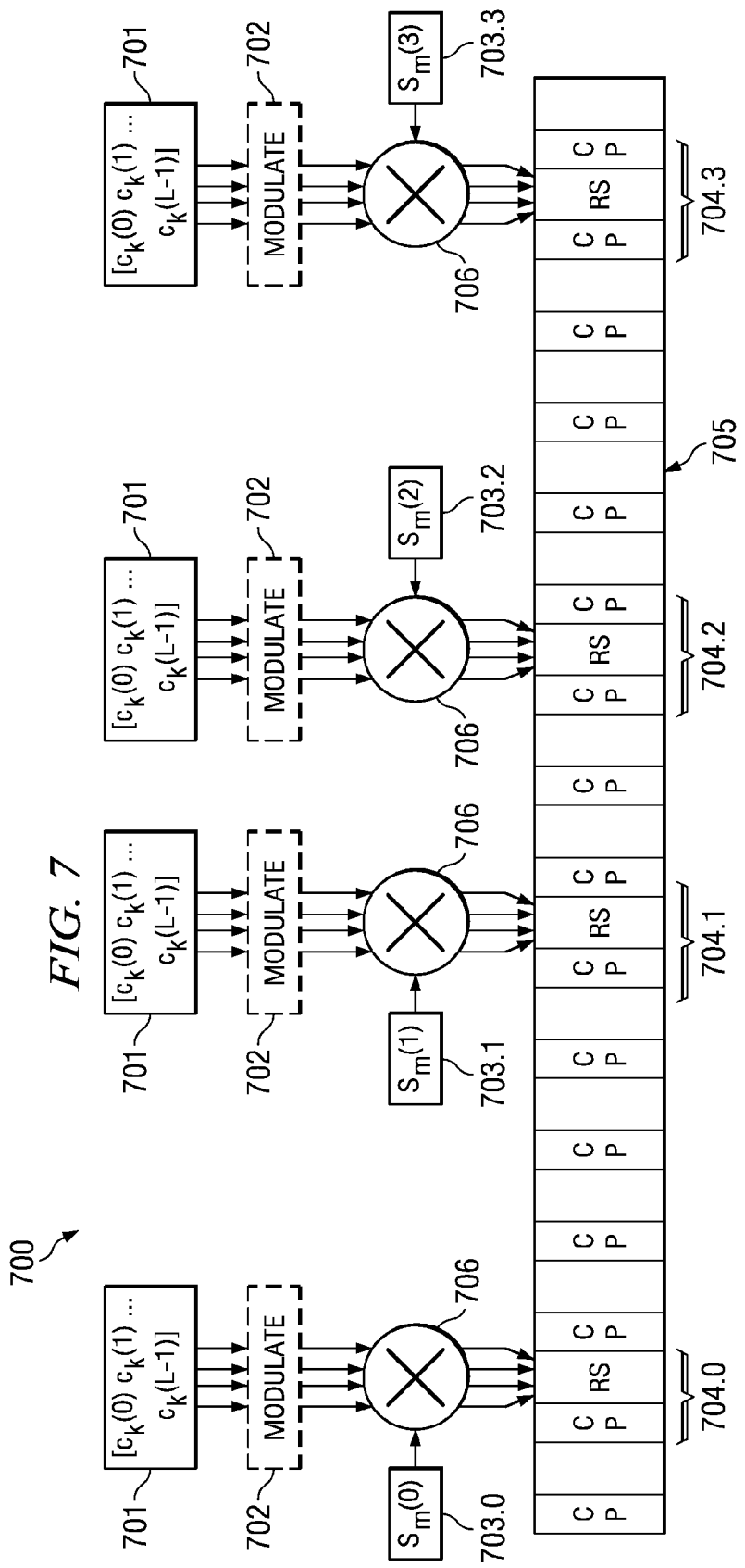

Having thus described the invention in general terms, reference will now be made to the accompanying drawings, which are not necessarily drawn to scale (for example, the number of sub-carriers in FIG. 2 through FIG. 7 may be substantially larger than illustrated, such as tens, hundreds or thousands of sub-carriers), and wherein:

FIG. 1 is a diagram illustrative of an exemplary wireless communication system;

FIG. 2 is a diagram illustrative of an exemplary OFDM(A) reference signal transmitter;

FIG. 3 is diagram illustrative of an exemplary DFT-spread OFDM(A) reference signal transmitter;

FIG. 4 is a block diagram showing an apparatus for reference signal generation in accordance with a first embodiment of the invention;

FIG. 5 is a block diagram showing an apparatus for reference signal generation in accordance with a second embodiment of the invention;

FIG. 6 is a block diagram showing an apparatus for reference signal generation in accordance with a third embodiment of the invention;

FIG. 7 is a block diagram showing an apparatus for reference signal generation in accordance with a fourth embodiment of the invention;

FIG. 8 is a block diagram showing an apparatus for reference signal reception in accordance with the embodiment of the invention described in FIG. 6.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art.

This invention will be described using CAZAC sequences as baseline sequences for RS generation. CAZAC sequences are well-described in the literature and can be found in several publications. For example, they are studied in the article by A. Milewski, "Periodic sequences with optimal properties for channel estimation and fast start-up equalization", *IBM Journal of Research & Development*, vol. 27, No. 5, September 83, pages 426-431. CAZAC sequences include a category of sequences that are polyphase sequences. See for example: L. H. Zetterberg "A class of codes for polyphases signals on a band-limited gaussian channel", *IEEE Trans. on Info. Theory*, IT-11, pp 385, 1965; also see, A. J. Viterbi "On a class of polyphases codes for the coherent gaussian channel", *IEEE Int. Cony. Record, Part 7*, pp 209, 1965. D. C. Chu "Polyphase Codes with Good Periodic Correlation Properties." *IEEE Trans. Info. Theory* IT-18, pp. 531-532 (July 1972). CAZAC sequences also include the so-called generalized chirp like (GCL) sequences, as shown in the reference B. M. Popovic, "Generalized Chirp-like Polyphase Sequences with Optimal Correlation Properties," IEEE Trans. Info. Theory, vol. 38, pp. 1406-1409, July 1992. See also, U.S. Pat. No. 3,008,125 by Zadoff et al.

As a specific example of a CAZAC sequences, we cite the formula for the Zadoff-Chu (ZC) family of CAZAC sequences given in page 53 from K. Fazel and S. Keiser, "Multi Carrier and Spread Spectrum Systems," John Willey and Sons, 2003. Let L be any positive integer, and let k be any number which is relatively prime with L. Also, let q be any integer. Then, according to the provided reference, the n-th entry of the k-th Zadoff-Chu CAZAC sequence is given as follows $$c_k(n) = \exp\left[j2\pi k \frac{n(n+1)/2 + qn}{L}\right] \text{ for } L \text{ odd}$$

$$c_k(n) = \exp\left[j2\pi k \frac{n^2/2 + qn}{L}\right] \text{ for } L \text{ even}$$

The set of Zadoff-Chu CAZAC sequences has following desirable properties (regardless of the value of q)

Constant magnitude (or constant amplitude). This property is valid for generic CAZAC sequences, and is not specific to the Zadoff-Chu family.

Zero circular auto-correlation. This property is valid for generic CAZAC sequences, and is not specific to the Zadoff-Chu family.

Flat frequency domain response. This means that the magnitudes of each DFT entry of a CAZAC sequence are all equal. It can be shown that this property is mathematically equivalent to zero circular auto-correlation property. Thus, this property is valid for generic CAZAC sequences, and is not specific to the Zadoff-Chu family.

Circular cross-correlation between two sequences is low and with constant magnitude which is independent of the sequence offset. This property is specific to the Zadoff-Chu CAZAC sequences (with the integer q being fixed) and prime L.

From a base family of CAZAC sequences, additional sequences can be generated using any of the following operations on each individual sequence: multiplication by a complex constant, DFT, IDFT, FFT, IFFT, cyclic shift, and block-repetition (and, under certain conditions, sequence truncation). With block-repetition, the zero cyclic auto-correlation property holds only up to a certain delay. Thus, with block-repetition, the cyclic auto-correlation is zero in the vicinity of the peak (this property is also referred to as pseudo-CAZAC). Nevertheless, the disclosed invention does not preclude the use of such pseudo-CAZAC sequences. Furthermore, the disclosed invention does not preclude the use of sequences which are generated from other base CAZAC sequences, using any of the described operations (multiplication by a complex constant, DFT, IDFT, FFT, IFFT, cyclic shift, block-repetition, truncation), or a combination thereof.

The use of CAZAC sequences in this invention is only exemplary. Other sequences with desirable auto and cross-correlation properties can be used as well, in conjunction with the disclosed invention, as follows.

FIG. 4 is a block-diagram showing an apparatus in accordance with an embodiment of the invention. Apparatus 400 comprises from: baseline RS generator 401, RS Modulate block 402, complex multiplier block 406, and the block-spreading sequence generator 403. In turn, the block spreading sequence generator 403 comprises of sub-blocks: 403.0 which generates first entry of the block-spreading sequence, 403.1 which generates second entry of the block-spreading sequence, etc, until the 403.(T−1) which generates the last entry of the block-spreading sequence. Elements of apparatus may be implemented as components in a programmable processor or Digital Signal Processor (DSP).

In one embodiment of the invention, each of RS blocks (404.0, 404.1, etc, 404.(T−1)), from a time interval 405, is generated using block spreading, as follows. To generate each RS block, the baseline RS generator 401 generates an RS sequence. Generated baseline RS sequence is then passed to the "Modulate" block 402. The "Modulate" block can be any one of the modulators shown in the prior art (for example, FIG. 2 or FIG. 3), but this is not mandatory. Subsequently, the entire modulated RS sequence is block-multiplied with a block-spreading entry (403.0 or 403.1, etc, or 403.(T−1)) of the block-spreading sequence 403, using the complex multiplier block 406. The block spreading sequence 403 may have elements exclusively comprising of +1 and −1 in which case the multiplication block 406 may simply be replaced by sign flips or no flips. To generate RS block 404.0, the block-spreading entry 403.0 is used, to generate RS block 404.1, the block-spreading entry 403.1 is used, etc, and to generate RS block 404.(T−1), the block-spreading entry 403.(T−1) is used. Obviously, at times, a number of computations can be saved by performing 401 and 402 only once per time interval 405. Data and/or control transmission can occur in between RS blocks.

FIG. 5 is another block-diagram showing an apparatus in accordance with an embodiment of the system. In contrast to FIG. 4, the apparatus from FIG. 5 performs block-spreading prior to the modulation. Apparatus 500 comprises from: baseline RS sequence generator 501, complex multiplier 506, block-spreading sequence generator 503, which generates block-spreading entries (503.0, 503.1, etc, 503.(T−1)) of the block-spreading sequence, and finally, the series of modulator blocks 502.0, 502.1, etc, 502.(T−1). Each of the modulator blocks can be one of the modulators shown in the prior art (for example, FIG. 2 or FIG. 3), but this is not mandatory. Each of the modulator blocks can operate on a different set of data.

In another embodiment of the invention, each of RS blocks 503.0, 503.1, etc, 503.(T−1) from the time interval 504 is generated using block-spreading, as follows. First, the baseline RS generator block 501 generates the baseline RS sequence. To generate the RS block "t" (where t take on values 0, 1, . . . , T−1), the entire baseline RS sequence is multiplied by the block-spreading entry 503.t, using the multiplier 506, and then modulated using the "Modulate" block 502.t. At times, a number of computations can be saved by performing 501 only once per transmission time interval. Data and/or control transmission can occur in between RS blocks. In a number of different scenarios, embodiment from FIG. 5 can be made equivalent to the embodiment from FIG. 4.

To separate different transmitters, prior art methods consider using a different baseline RS sequence for different transmitters. The disclosed invention considers that different transmitters can also be separated when they are using an identical (or correlated) baseline RS sequence, but with different block-spreading sequences. These different transmitters can be either: a) different mobiles, b) different base-stations, c) different antennas from the same mobile, d) different antennas from the same base-station, or e) any combination thereof. Thus, disclosed invention allows a system designer to increase the total number of different RS signals through orthogonal multiplexing by a factor which is the total number of used block-spreading sequences. The block-spreading sequence is denoted as $s_m(t)$, which further denotes the t-th entry of the m-th block spreading sequence. Multiple choices for block spreading sequences exist and any set of sequences with good correlation properties can be used. For example, the conventional Walsh sequences can provide such a set of block spreading sequences. It is also possible to use cyclic shifts of a root CAZAC sequence, to generate different block-spreading sequences.

To illustrate how block-spreading can be used to separate different transmitters, we now turn to FIG. 6, illustrating an exemplary time interval 605 containing two distinct RS blocks, namely 604.0 and 604.1. Other blocks can carry data and control, and all blocks are preceded by cyclic-prefix transmission (CP), as common in OFDM-based systems. Two different transmitters which use a common baseline RS sequence $[c_k(0), c_k(1), \ldots, c_k(L-1)]$, generated by 601, can be separated using orthogonal block-spreading sequences. For one transmitter, the block-spreading sequence generator 603.0 and 603.1 can generate entries $s_0=[s_0(0), s_0(1)]=[+1, +1]$. For another transmitter, the corresponding block-spreading sequence generator 603.0 and 603.1 can generate entries using $s_1=[s_1(0), s_1(1)]=[+1, -1]$. The previous block spreading sequences are the well known Walsh sequences with length 2. The modulator block 602 can be one of the modulators shown in the prior art (for example, FIG. 2 or FIG. 3), but this is not mandatory. The multiplier block 606 in case of Walsh sequences can be a simple sign operator according to the corresponding sign of the Walsh sequence element. In this specific case, the multiplier block 606 only flips the sign bit for the second transmitter in the second RS block. Also, each transmitter can reduce computation by executing 601 and 602 only once per time interval 605.

A number of different receiver structures can be applied to the disclosed invention. For example, the receiver structure in FIG. 8 corresponds to a transmitter structure in FIG. 6 (additional receiver structures corresponding to the remaining transmitter configurations are straightforward to derive and are omitted for brevity). Receiver 800 first performs block de-spreading for the received RS signal which is eventually used for channel estimation. Block de-spreading is performed on received RS blocks 804.0 and 804.1, using the multiplier 806 and adder 802. Here, the received blocks are first block-multiplied by complex conjugates of the corresponding block-spreading sequence (803.0 or 803.1), and then block-added using 802. Further channel estimation operations are performed by 801 to arrive at channel estimates 807. Once again, in case of Walsh block spreading sequences comprising of +1 and −1 values, complex conjugates and multiplication are not needed as the de-spreading operation is simply the appropriate sign application followed by addition over the Walsh sequence elements. Finally, note that an alternate receiver structure can first perform channel estimation (RS demodulation etc) first, and then follow up by block-de-spreading.

To further illustrate how block-spreading can separate different transmitters, we now turn to FIG. 7, further illustrating another exemplary structure containing four distinct RS blocks, namely 704.0, 704.1, 704.2 and 704.3. Other blocks can carry data and control, and all blocks are preceded by cyclic-prefix transmission (CP), as common in OFDM-based systems. Two different transmitters which use a common (or just correlated) baseline RS sequence $[c_k(0), c_k(1), \ldots, c_k(L-1)]$, generated by 701, can be separated using orthogonal block-spreading sequences. For one transmitter, the block-spreading sequence generator 703.0, 703.1, 703.2, 703.3 can generate entries $s_0=[s_0(0), s_0(1)\ s_0(2), s_0(3)]=[+1, +1, +1, +1]$. For another transmitter, the block-spreading sequence generator 703.0, 703.1, 703.2, and 703.3 can generate entries $s_1=[s_1(0), s_1(1)\ s_1(2), s_1(3)]=[+1, -1, +1, -1]$. The previous block spreading sequences are the well known Walsh sequences with length 4. The modulator block 702 can be one of the modulators shown in the prior art (for example, FIG. 2 or FIG. 3), but this is not mandatory.

Thus, with the proposed block-spreading transmission of the RS, the entire RS transmission, for a particular mobile, is defined using two sequences: the baseline RS sequence $[c_k(0), c_k(1), \ldots, c_k(L-1)]$, and the block-spreading sequence $[s_m(0), s_m(1) \ldots s_m(T-1)]$ which in the examples of FIG. 6 and FIG. 7 is a Walsh sequence. Each of these two sequences has to be assigned to the mobile. This is done, explicitly or implicitly, by the base-station serving (or controlling) the reference mobile.

To maintain (near) orthogonality among the simultaneously multiplexed signals through the exemplary block-spreading in FIG. 4 or FIG. 5 or FIG. 6 or FIG. 7, it is assumed that the channel does not change substantially in the time period between the transmissions of different RS blocks. Validity of this assumption can be determined by the assigning Node B though estimation of the Doppler shift (or Doppler spread) of the mobiles. Thus, the controlling node-B may multiplex slow-moving mobiles using block-spreading. Any additional fast moving mobile can then be multiplexed using a different baseline RS sequence (for example $c_2(n)$), or a different cyclic shift, or using a different set of tones.

All herein described reference signal transmissions (or parts of them) may be pre-computed, stored in the memory of the UE device, and used when necessary. Any such operation (pre-computing and storage) does not limit the scope of the invention.

The exemplary embodiment of the invention assumes that the reference signal is time division multiplexed (TDM) with the data and/or control signal (from a single UE), that is, transmission of the reference signal does not occur concurrently with the data and/or control signal. This assumption only serves to simplify the description of the invention, and is not mandatory to the invention. Nevertheless, when the reference signal is TDM multiplexed with the data signal, the two can use different modulation. For instance, data signal can use SC-OFDM(A), while the reference signal can use OFDMA modulation.

In case of multi-antenna transmission, multiple antennas of a singe UE can be treated as different UEs (different transmitters), for the purpose of allocating reference signals. All herein described designs extend in a straightforward manner to the case of multi-antenna transmission.

All herein described multi-user allocations can be trivially reduced and also applied to the single-user scenario.

The principle of "block spreading" also applies to the multiplexing of other signals, such as acknowledgement (ACK/NAK) and channel quality indicator (CQI) signals from different UEs. In this case, different UEs can use different sequences $[c_k(0), c_k(1), \ldots, c_k(L-1)]$ or $[s_m(0), s_m(1) \ldots s_m(T-1)]$, that are modulated with an information symbol which is identical to described embodiments. For example, an ACK transmission may correspond to the transmission of the same sequence as for the RS while a NAK transmission may correspond to its algebraic opposite. For CQI transmission, complex modulation symbols can be used to scale the transmitted sequence. Thus, embodiments of the invention can also be applied beyond the RS transmission.

Many other modifications and other embodiments of the invention will come to mind to one skilled in the art to which this invention pertains having the benefit of the teachings presented in the foregoing descriptions, the associated drawings, and claims. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

All herein described reference signal transmissions may (or may not) be preceded by a "cyclic prefix," which is a common practice in all frequency division multiplex systems (FDM). These systems include, but are not restricted to, OFDM, OFDMA, FDMA, DFT-spread OFDM, DFT-spread OFDMA, single-carrier OFDMA (SC-OFDMA), and single-carrier OFDM (SC-OFDM) pilot transmission. Transmission (or non-transmission) of the "cyclic prefix" doesn't affect the scope of the invention.

Definition of "time interval," during which the above block-spreading is applied, in the exemplary embodiments, can be understood as any pre-determined time unit. For example, it "time interval" can correspond to frame, subframe, transmission time interval, slot, or any other time unit.

At times, RS block-spreading may simply be performed just to achieve interference randomization. In this case, RS block-spreading can be implemented using either "short" or "long" block-spreading sequences.

What is claimed is:

1. A method for allocating sequences to a plurality of user equipments in a communication system for transmission over at least two time periods, said method comprising:
   selecting a sequence;
   allocating to a first user equipment from said plurality of user equipments, said selected sequence for transmission in said at least two time periods;
   allocating to a second user equipment, from said plurality of user equipments, said selected sequence for transmission in a first of said at least two time periods; and
   allocating to said second user equipment the algebraic opposite (negative) of said selected sequence for transmission in a second of said at least two time periods.

2. The method of claim 1, wherein said sequence is based on a constant amplitude zero cyclic auto-correlation (CAZAC) sequence.

3. The method of claim 2, wherein said CAZAC sequence is a Zadoff-Chu sequence.

4. The method of claim 1, wherein said second user equipment transmission uses said selected sequence in said second of said at least two time periods and uses said opposite (negative) of said sequence in said first of said at least two time periods.

5. The method of claim 1, wherein said sequence serves as a reference signal.

6. The method of claim 1, wherein said sequence serves as an acknowledgement signal.

7. The method of claim 1, wherein said sequence serves as a channel quality indication signal.

8. A method for transmitting signals over N transmission periods from a plurality of user equipments in a communication system, said method comprising:
selecting a first sequence;
selecting M second sequences of length N wherein M is smaller than or equal to N;
allocating to each of M user equipments, of said plurality of user equipments, said first sequence:
allocating to said each of M user equipments, of said plurality of user equipments, one of said M second sequences wherein each of said M user equipments is allocated a different sequence among said M second sequences;
multiplying at each of said M user equipments said first sequence with each of the N elements of said one of said M second sequences to produce N third sequences at each of said M user equipments; and
transmitting each of said N third sequences, from each of said M user equipments, during each of said N time periods.

9. The method of claim 8, wherein said first sequence is based on a constant amplitude zero cyclic auto-correlation (CAZAC) sequence.

10. The method of claim 9, wherein said CAZAC sequence is a Zadoff-Chu sequence.

11. The method of claim 8, wherein each of said M second sequences of length N is a Walsh sequence.

12. The method of claim 8, wherein said each of said N third sequences serves as a reference signal.

13. The method of claim 8, wherein said each of said N third sequences serves as a positive acknowledgement signal when multiplied with +1 and as a negative acknowledgement signal when multiplied with −1.

14. The method of claim 8, wherein said each of said N third sequences, further modulated with an information symbol, serves as a channel quality indication signal.

15. An apparatus for transmitting signals, comprising:
circuitry for generating a first sequence;
circuitry for generating a second sequence of length N;
circuitry for altering said first sequence according to each of the N elements of said second sequence to produce N third sequences; and
circuitry for transmitting a different one of said N third sequences during each of N time periods.

16. The apparatus of claim 15, wherein said altering comprises multiplying said first sequence with each of the N elements of said second sequence to produce N third sequences.

17. The apparatus of claim 15, wherein said altering comprises flipping or not flipping a sign of said first sequence according to each of the N elements of said second sequence to produce N third sequences.

18. The apparatus of claim 17, wherein said flipping a sign of said first sequence is equivalent to multiplying the first sequence with −1 and said not flipping a sign of said first sequence is equivalent to multiplying the first sequence with +1.

19. The apparatus of claim 15, wherein said first sequence is based on a constant amplitude zero cyclic auto-correlation (CAZAC) sequence.

20. The apparatus of claim 19, wherein said CAZAC sequence is a Zadoff-Chu sequence.

21. The apparatus of claim 15, wherein said second sequence of length N is a Walsh sequence.

22. The apparatus of claim 15, wherein said each of said N third sequences serves as a reference signal.

23. The apparatus of claim 15, wherein said each of said N third sequences serves as a positive acknowledgement signal when modulated with +1 and as a negative acknowledgement signal when modulated with −1.

24. The apparatus of claim 15, wherein said each of said N third sequences, further modulated with an information symbol, serves as a channel quality indication signal.

* * * * *